United States Patent [19]

Marion et al.

[11] 4,411,670

[45] Oct. 25, 1983

[54] PRODUCTION OF SYNTHESIS GAS FROM HEAVY HYDROCARBON FUELS CONTAINING HIGH METAL CONCENTRATIONS

[75] Inventors: Charles P. Marion, Mamaroneck; Frederick C. Jahnke, Rye, both of N.Y.

[73] Assignee: Texaco Development Corporation, White Plains, N.Y.

[21] Appl. No.: 385,742

[22] Filed: Jun. 7, 1982

[51] Int. Cl.³ .............................................. C10J 3/46
[52] U.S. Cl. ................................... 48/197 R; 48/212; 48/215; 252/373
[58] Field of Search .................... 48/197 R, 212, 215, 48/206; 252/373

[56] References Cited

U.S. PATENT DOCUMENTS

| | | | |
|---|---|---|---|
| 3,620,700 | 11/1971 | Schlinger et al. | 48/215 |
| 3,951,617 | 4/1976 | Crouch | 48/215 |
| 3,998,609 | 12/1976 | Crouch et al. | 48/215 |
| 4,247,302 | 1/1981 | Woldy et al. | 48/197 R |
| 4,251,228 | 2/1981 | Muenger et al. | 48/197 R |

Primary Examiner—Peter F. Kratz

Attorney, Agent, or Firm—Carl G. Ries; Robert A. Kulason; Albert Brent

[57] ABSTRACT

Heavy hydrocarbon fuel containing high metal concentrations and all of the soot which is rich in metals that is produced in the system, are feedstocks in a partial oxidation process for the simultaneous continuous production of two streams of cleaned, raw synthesis gas having high and low $H_2O$/dry gas mole ratios, respectively. In the process, all of the stream of hot, raw synthesis gas containing entrained particulate carbon and ash that is produced in a first gas generator is quench cooled and scrubbed with water in a quench tank. Simultaneously, split streams of hot raw synthesis gas containing entrained particulate carbon and ash are produced in a second gas generator. One split gas stream is quench cooled and scrubbed with water in a quench tank while the other split gas stream is simultaneously cooled in a convection-type gas cooler and then scrubbed with water. All of the soot recovered from the quench cooling and scrubbing waters in the process is recycled to the first gas generator as a portion of the reactant fuel feed. Fouling and plugging of the tubes of a convection-type gas cooler associated with the second gas generator is prevented.

10 Claims, 1 Drawing Figure

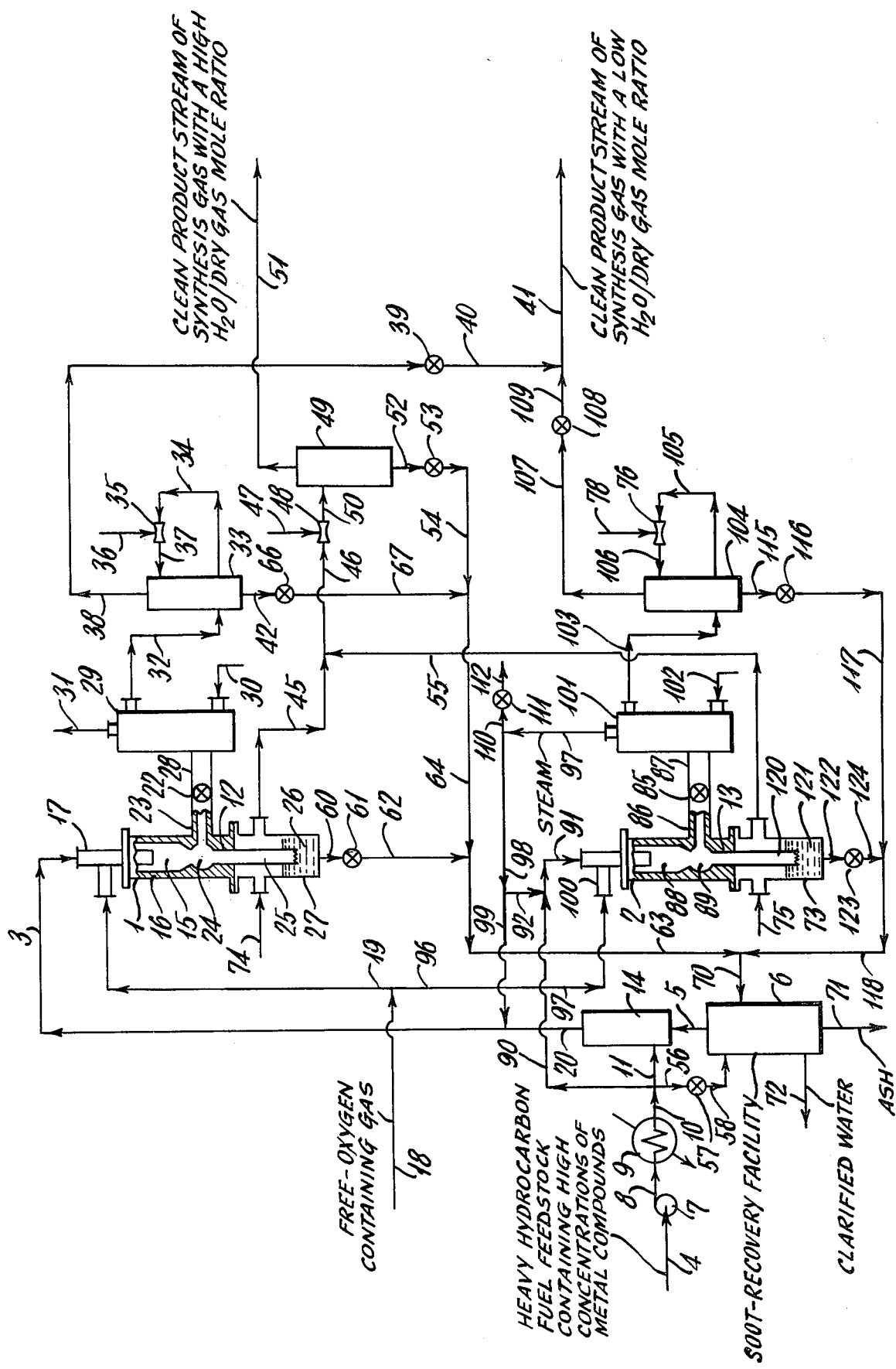

PRODUCTION OF SYNTHESIS GAS FROM HEAVY HYDROCARBON FUELS CONTAINING HIGH METAL CONCENTRATIONS

BACKGROUND OF THE INVENTION

This invention relates to the partial oxidation of a liquid hydrocarbon fuel to produce synthesis gas. More specifically, it relates to a process for simultaneously producing two clean product streams of synthesis gas, one gas stream with a high and the other gas stream with a low, $H_2O$/dry gas mole ratio by the partial oxidation of heavy hydrocarbon feedstocks containing high metal concentrations.

When a heavy liquid hydrocarbon fuel containing high metal concentrations such as vacuum resid is reacted by partial oxidation, entrained in the hot, raw gas stream is particulate carbon and ash, i.e., nickel, vanadium, and iron compounds. After the raw gas stream is cleaned free from particulate matter, it is economically desirable to dispose of the particulate carbon in the gas generator. However, recent commercial experience in gasifying heavy feed stocks containing high metal concentrations with 100% soot recycle has shown that the convection type gas coolers in the system may be then subject to shutdown because of fouling. Deposits may plug the gas cooler tube inlets or may collect downstream in the low-temperature sections of the gas cooler tubes. These problems and others are now avoided by the subject invention.

The hot raw effluent gas stream from the reaction zone of a partial oxidation gas generator may comprise principally $H_2$, $CO$, $CO_2$, and $H_2O$ together with other gaseous constituents, and minor amounts of entrained particulate matter, i.e., particulate carbon and ash. The hot, raw effluent gas must be cooled and cleaned to produce synthesis gas or fuel gas. Synthesis gas is important commercially as a source of feed gas for the synthesis of hydrocarbons or oxygen containing organic compounds, or for producing hydrogen or ammonia.

Entrained particulate carbon and ash may be removed from the raw effluent gas by quenching and scrubbing with water such as described in coassigned U.S. Pat. No. 3,232,728. Cleaning the effluent gas by scrubbing with an oil-carbon slurry is described in coassigned U.S. Pat. No. 3,639,261. Recovery of the soot, from carbon-water dispersions in a carbon-recovery facility is described in coassigned U.S. Pat. Nos. 2,999,741; 2,992,906; 3,044,179; and 4,134,740. Typical decanting procedures are described in coassigned U.S. Pat. Nos. 3,980,592 and 4,014,786. These coassigned U.S. Patents are incorporated herein by reference.

SUMMARY

In accordance with the invention, the feedstock to a partial oxidation process for the simultaneous continuous production of two streams of cleaned synthesis gas having high and low $H_2O$/dry gas mole ratios respectively may comprise a heavy hydrocarbon fuel containing high metal concentrations as well as all of the soot rich in metal valves recovered in the process.

Two free-flow noncatalytic refractory lined partial oxidation gas generators are used. All of the hot raw synthesis gas produced in the first gas generator is quench cooled in water in a quench tank; and, simultaneously, all of the hot raw synthesis gas produced in the second gas generator is split into two separate hot, raw gas streams. One of said split gas streams is quench cooled in water in a quench tank. Simultaneously, the other split gas stream is cooled in a convection-type gas cooler by indirect heat exchange with boiler feed water, without the tubes in the gas cooler plugging or fouling. The two quench cooled gas streams are combined and scrubbed free from particulate matter, i.e., particulate carbon and ash with water to produce a clean product stream of synthesis gas having a high $H_2O$/dry gas mole ratio. Simultaneously, the stream of synthesis gas leaving the gas cooler is separately scrubbed free from particulate matter to produce a clean product stream of synthesis gas having a low $H_2O$/dry gas mole ratio. The streams of carbon-water-ash dispersion from all of the quench tanks and gas scrubbers is processed in a soot-recovery facility to separate clarified water, ash, and to produce a liquid dispersion of soot in water or in a liquid hydrocarbon carrier. All of this dispersion is then introduced into the first gas generator as a portion of the liquid hydrocarbon fuel feed. Fouling and plugging of the tubes of a convection-type gas cooler associated with the second gas generator is prevented even though there is total carbon recycle in the process by: (1) lowering the fraction of ash in the gas stream going to the gas cooler due to split flow, and (2) decreasing the total metals in the feed to the second gas generator by eliminating the metals normally recycled in the soot recycle.

BRIEF DESCRIPTION OF THE DRAWING

The invention will be further understood by reference to the accompanying drawing. The drawing is a schematic representation of a preferred embodiment of the process.

DESCRIPTION OF THE PREFERRED EMBODIMENTS

A more complete understanding of the invention may be had by reference to the accompanying drawing which illustrates one embodiment of the invention in which conventional partial oxidation gas generators 1 and 2 are simultaneously and continuously operated.

Synthesis gas generator 1 is fed with a fuel mixture from line 3 which comprises heavy liquid hydrocarbon fuel containing high concentrations of metal compounds from line 4 and a liquid dispersion of soot containing metals in a liquid carrier from line 5 by way of a conventional soot recovery facility 6 as previously described. Actually, the heavy liquid hydrocarbon fuel in line 4 is pumped by means of pump 7 through line 8, heater 9 (optional), and lines 10 and 11 into mixer 14 where it is mixed with the liquid dispersion of soot from line 5. Part of the hydrocarbon fuel feedstock in line 10 is preferably sent to soot-recovery facility 6 by way of line 56, valve 57, and line 58 to provide the bulk of the liquid carrier for the soot in line 5. The fuel mixture in line 20 is mixed in line 3 with a temperature moderator such as steam from line 99.

The mixture of fuel and steam in line 3 is introduced into the free-flow noncatalytic reaction zone 15, lined with thermal insulating refractory 16, of gas generator 1 by way of one passage in burner 17 located in the top of gas generator 1. At the same time, a stream of free-oxygen containing gas from line 18 is passed through line 19 and is introduced into reaction zone 15 of gas generator 1 by way of another passage in burner 17. The autogenous partial oxidation of the fuel mixture then takes place in the reaction zone of gas generator 1 to produce a hot, raw synthesis gas stream containing unreacted entrained particulate carbon and ash. During normal operation, all of the hot raw synthesis gas stream is quench cooled and scrubbed with water in a quench tank located below the reaction zone. Thus, in the preferred embodiment, with flow control means 22 closed in refractory lined transfer line 23, or alternatively flow control means valve 39 closed, all of the raw synthesis gas leaving reaction zone 15 is passed down through thermal refractory lined gas diversion chamber 24, refractory lined passage 12, dip-tube 25 and into quench water 26 contained in the bottom of a conventional-type quench tank 27 located below reaction zone 15. Flow control means 22 is a blank flange plate or valve located in the line upstream or downstream from gas cooler 29 for controlling the flow rate, or starting or stopping the passage of the split, hot, raw synthesis gas stream therethrough.

The partially cleaned quench cooled stream of synthesis gas with most of the particulate carbon and ash removed leaves quench tank 27 by way of line 45 and is mixed with a second stream of partially cleaned quench cooled stream of synthesis gas from line 55, to be further described. The mixture of gases is passed through line 46, and into venturi scrubber 48 where it is scrubbed free of any remaining entrained particulate carbon and ash with water from line 47. The mixture of synthesis gas and liquid dispersion comprising particulate carbon, water, and ash enters gas scrubbing and separation column 49 through line 50. A clean product stream of synthesis gas having a high $H_2O$/dry gas mole ratio in the range of about 1.0 to 2.0, such as 1.5 leaves by way of line 51 at the top of separator 49, and the liquid dispersion comprising particulate carbon, water and ash leaves through bottom line 52, valve 53 and line 54.

The liquid dispersion comprising particulate carbon, water, and ash in the bottom of quench tank 27 is passed through line 60, valve 61, line 62 and into line 63 where it is mixed with the dispersion comprising particulate carbon, water, and ash from lines 54 and 64 from separator 49.

During normal operation about 45 to 55 volume percent, such as 50 vol.% of the plant-design total synthesis gas output is produced by gas generator 1.

Simultaneously with the operation of gas generator 1, gas generator 2 is also being operated to produce the remainder of the plant-design total synthesis gas output. Preferably, synthesis gas generators 1 and 2 are substantially of the same size and produce gas at the same rate. Flow control means 85 in refractory lined line 86–87 is open, or alternatively flow control means such as valve 108 is open, and the hot raw synthesis gas produced in refractory lined reaction zone 88 of gas generator 2 is split into two gas streams in thermal refractory lined gas-diversion chamber 89. Flow control means 85 is a blank flange plate or valve located in the line upstream or downstream from gas cooler 101 for controlling the flow rate, or starting or stopping the passage of the split hot raw synthesis gas stream therethrough. Heavy hydrocarbon fuel feedstock containing high concentrations of metal compounds from line 4, pump 7, line 8, optional heater 9, lines 10 and 90 is mixed in line 91 with a temperature moderator such as steam from line 92. The mixture of fuel and steam is introduced into the reaction zone of gas generator 2 by way of one passage in burner 100. In contrast with the reactant fuel fed to gas generator 1, there is no soot dispersion containing metals from line 5 mixed with the reactant fuel feed to gas generator 2. A stream of free-oxygen containing gas from line 18 is passed through line 96 and is introduced into reaction zone 88 of gas generator 2 by way of burner 100.

As previously mentioned, during normal operation the raw effluent synthesis gas stream from reaction zone 88 in gas generator 2 is split into two hot, raw synthesis gas streams. The two split, raw synthesis gas streams may be produced at the same gas rate. For example, the first split, how raw synthesis gas stream may comprise about 10 to 40 vol.%, say 25 vol.% of the plant-design total synthesis gas output and may be passed through refractory lines 86–87, flow control means 85, and conventional convection-type gas cooler 101 where it passes in indirect heat exchange with boiler feed water (BFW). The BFW enters through line 102 and leaves as saturated or superheated steam through through lines 97–98. This steam is employed as the temperature moderator in one or both gas generators. Alternatively, a portion of steam may be removed for use elsewhere in the system through line 110, valve 111 and line 112.

The partially cooled synthesis gas leaves gas cooler 101 through line 103 and is cleaned in gas scrubbing and separation column 104. The gas stream leaves by line 105 and is scrubbed free from entrained particulate carbon and ash in venturi scrubber 76 with water from line 78. The mixture of synthesis gas and water passes through line 106 into column 104.

A stream of liquid dispersion of particulate carbon, water, and ash leaves gas scrubber and separator 104 through line 115, valve 116, line 117, and is mixed in line 118 with the stream of liquid dispersion of particulate carbon, water, and ash from line 124 to be described further. Further mixing takes place in line 70 with the stream of liquid dispersion of particulate carbon, water, and ash from line 63. Conventional lock hoppers (not shown) may be used to remove the liquid dispersion of particulate carbon, water, and ash from the bottoms of quench tanks 27 and 73 and gas scrubbing and separation columns 33, 49, and 104.

The stream of liquid dispersion of particulate carbon, water, and ash in line 70 is processed in soot-recovery facility 6.

Soot-recovery facility 6 may be any suitable conventional mode for separating clarified water and a portion of the ash from the liquid dispersion of particulate carbon, water, and ash to produce the liquid dispersion of soot in line 5. The clarified water stream leaves through line 72 and a portion may be recycled to quench tanks 27 and 73 by way of lines 74 and/or 75 respectively. Another portion of the clarified water may be recycled to venturi scrubbers 35, 48 and 76 by way of lines 36, 47 and 78, respectively. The stream of liquid dispersion of soot in a liquid carrier from the group liquid hydrocarbon fuel, water, and mixtures thereof is passed through line 5 into mixer 14, previously described. Soot comprises particulate carbon containing high metal values. The remainder of the metals and metal compounds leave the system through line 71 as the ash stream.

A clean product stream of synthesis gas having a low $H_2O$/dry gas mole ratio in the range of about 0.05 to 0.5, such as about 0.1 leaves column 104 through overhead line 107, valve 108, and lines 109 and 41.

The second split, hot raw synthesis gas stream may comprise the remainder of the hot, raw synthesis gas produced in reaction zone 88 of synthesis gas generator 2. For example, the second split, hot, raw, synthesis gas stream may comprise about 10 to 40 vol.%, say 25 vol.% of the plant-design total synthesis gas output. The term 'plant-design total synthesis gas output' is the total volume of product gas that the system is designed to produce, including both streams of synthesis gas with high and low $H_2O$/dry gas mole ratios, respectively.

The first and second split streams of hot, raw synthesis gas are simultaneously processed. The second split stream of hot, raw synthesis gas is passed through chamber 89, refractory lined passage 13, dip-leg 120 into water 121 contained in the bottom of a conventional-type quench tank 73 located below reaction zone 88. The entrained particulate carbon and ash are removed form the gas stream by the turbulent scrubbing action of the quench water. The two streams of quench cooled and scrubbed synthesis gas from lines 55 and 45 are mixed together in line 46 and further cleaned in the manner previously discussed to produce the clean product stream of synthesis gas with a high $H_2O$/dry gas mole ratio in line 51. A liquid dispersion comprising particulate carbon, water, and ash in the bottom of quench tank 73 is removed through line 122, valve 123, line 124, and is mixed in line 118 with the stream of liquid dispersion of particulate carbon, water and ash from line 117, as previously described.

Quench water 26 and 121 in quench tanks 27 and 73 respectively and the quenched gas stream leaving the quench tanks are at a temperature in the range of about 300° to 600° F. such as about 400° to 500° F. Similarly, the temperature of the stream of synthesis gas in line 51 is in the range of about 300° to 600° F., such as about 400° to 500° F.

In another embodiment, a conventional-type gas cooler and scrubbing tower is provided downstream from gas generator 1. This provides the system with greater flexibility since either gas generator 1 to 2 but not both could be operated to produce two split streams of hot, raw synthesis gas—one hot split gas stream being cooled with water in a quench tank while the other hot, split gas stream is cooled in a gas cooler. Simultaneously, all of the hot, raw synthesis gas produced in the remaining gas generator is quench cooled with water in a quench tank. Further, all of the soot produced in the process and separated in the soot recovery facility is recycled as a portion of the feed to the gas generator from which all of the hot, raw synthesis gas is normally directly quench cooled in water. Accordingly, in this second embodiment with all of the hot raw, synthesis gas produced in gas generator 2 being passed directly into quench tank 73, flow control means 22 or alternatively 39 is open and flow control means 85 or alternatively 108 is closed. Further, the feedstream in lines 3 and 91 are switched to gas generators 2 and 1, respectively. The hot, raw split gas stream in insulated lines 23 and 28 is cooled in conventional convection-type gas cooler 29 by indirect heat exchange with boiler feedwater (BFW) from line 30. Saturated or superheated steam is produced and leaves through outlet line 31 for admixture with at least one of the reactant feedstreams in lines 3, 20, 91, or 96. The temperature of the partially cooled gas stream leaving gas cooler 29 or alternatively in the other embodiment from gas cooler 101 is in the range of about 250° to 750° F., such as about 350° to 500° F. The partially cooled synthesis gas in line 32 is cleaned in gas scrubbing and separation column 33, passed through line 34 into venturi scrubber 35 and scrubbed free from particulate carbon and ash with water from line 36, passed through line 34 into venturi scrubber 35 and scrubbed free from particulate carbon and ash with water from line 36, and then passed through line 37 into column 33. The temperature of the stream of synthesis gas leaving column 33 or alternatively in the other embodiment from column 104 is in the range of about 200° to 400° F., such as about 250° to 350° F. A product stream of clean synthesis gas having a low $H_2O$/dry gas mole ratio in the range of about 0.05 to 0.5, such as about 0.1 is removed from vessel 33 by way of line 38, valve 39, and lines 40 and 41. A water dispersion produced by scrubbing the entrained particulate carbon and ash from the split stream of synthesis gas is removed from the bottom of vessel 33 by way of line 42, valve 66, and line 67, and mixed in line 70 with the streams of liquid dispersion comprising particulate carbon, water, and ash from lines 54, 64, 63 and 118.

Advantageously, the flexibility of this system is such that either one or two streams of synthesis gas may be continuously produced even though one of the gas generators or associated gas cooler may have to be shut down for one reason or another. For example, with both synthesis gas generators 1 and 2 of the same size, if either gas generator had to be shut down, then during standby of the shutdown gas generator, the gas generator remaining in operation is capable of producing through quench one gas stream in the amount of up to about 75 vol.%, such as 50–75 vol.% of the plant-design total synthesis gas output with no gas stream being cooled in a convection-type gas cooler. Alternatively, during standby of one gas generator, the other gas generator in operation and fitted with a gas cooler is capable of producing one split gas stream through quench in the amount of up to about 50 vol.%, such as 30 to 50 vol.%, of the plant-design total synthesis gas output; and simultaneously cooling in an associated convection-type gas cooler for limited periods of time a second split gas stream in the amount of up to about 25 vol.%, such as about 10 to 25 vol.% of the plant-design total synthesis gas output.

Partial oxidation gas generator 1 for producing the hot, raw synthesis gas containing entrained particulate carbon and ash comprises a vertical unpacked free-flow noncatalytic cylindrical shaped steel pressure vessel lined with refractory, such as shown in coassigned U.S. Pat. No. 2,809,104. A typical quench drum is also shown in said patent. Partial oxidation gas generator 2 with a quench tank and gas cooler for producing split streams of synthesis gas is shown in coassigned U.S. Pat. No. 4,141,696. A burner, such as shown in coassigned U.S. Pat. No. 2,928,460, may be used to introduce the feed streams into the reaction zone of the gas generators. These coassigned U.S. Patents are incorporated herein by reference. The atomic ratio of free oxygen to carbon in the fuel (O/C ratio), is in the range of about 0.6 to 1.6, and preferably about 0.8 to 1.4. The exothermic partial oxidation reaction takes place in the presence of a temperature moderator selected from the group steam, water, $CO_2$, $N_2$, cooled and cleaned recycled synthesis gas and mixtures thereof. When steam or water is used as a temperature moderator, the $H_2O$/fuel weight ratio in the reaction zone is in the range of about 0.1 to 5, and preferably about 0.2 to 0.7. The partial oxidation reaction takes place in the reaction zone of the partial oxidation gas generator at an autogenous temperature in the range of about 1,700° to 3,500° F., such as in the range of about 2,000° to 2,800° F., and a pressure in the range of about 5 to 300 atmospheres, such as about 15 to 200 atmospheres.

The composition of the hot, raw effluent gas stream directly leaving the reaction zone of the partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.05 to 5.0 wt. %, such as 0.1 to 1.0 wt.% (basis total weight of fuel feed) when no soot dispersion from line 5 is mixed with the heavy hydrocarbon fuel feedstock (as in line 91), and in the range of about 0.2 to 20.0 wt.% when the soot dispersion from line 5 is in admixture with the heavy hydrocarbon fuel (as in line 3).

Depending on the composition after removal of the entrained particulate carbon and ash by quench cooling and/or scrubbing with water and with or without dewatering, the gas stream may be employed as synthesis gas, reducing gas, or fuel gas.

The heavy liquid hydrocarbon fuel containing high metal concentrations which is used as the principal fuel feed in partial oxidation gas generators 1 and 2 is generally unsatisfactory for use as a fuel for many purposes because of the corrosive nature of the ash. The corrosiveness of the ash is due primarily to the oxidation products of the naturally-occuring metal compounds. Advantageously, by the subject process these comparatively low cost fuels may now be used as a source for synthesis gas. These heavy liquid hydrocarbon fuels have a density in degrees API of 10 or less, and an initial boiling point of greater than 400° F. Such as in the range of about 400° to 600° F., say 450° to 500° F., when measured at atmospheric pressure in accordance with standard test methods of the American Society For Testing and Materials.

Naturally occurring metalic compounds or principally vanadium, nickel and iron, and traces of chromium and molybdenum, if any, including oil-soluble materials, colloidally dispersed metallic compounds and complex organometallic compounds, are present in these heavy liquid hydrocarbon fuels. The metals and compounds are present in combined amounts ranging from about 10 parts per million (ppm) to over 5000ppm, such as about 50 to 2000 ppm, say over 250 ppm (basis weight of the fuel). The reaction products of said metal constituents leave the reaction zone of the gas generator as metallic, oxide and sulfide ash particles entrained in the effluent gas stream.

A portion of the ash, i.e. about 5 to 75 wt.% (basis weight of ash) is separated from quench cooling and scrubbing water in the conventional soot recovery facility 6, for example by sedimentation. The remainder of the ash is recycled to the gas generator along with the liquid dispersion of soot. The liquid carrier in the soot dispersion is selected from the group water, liquid hydrocarbon fuel, and mixtures thereof. The solids content is in the range of about 0.1 to 8.0 wt.%, such as about 1.0 to 6.0 wt.%, and comprises a combination of particulate carbon and ash. About 5 to 50 wt.% of the soot comprises the metals Ni, V, and Fe and their reaction products; and the remainder is carbon.

Heavy liquid hydrocarbon fuel containing high metal concentrations suitable for use in the subject process may be selected from the group consisting of crude residua from petroleum distillation and cracking process operations, petroleum distillate, reduced crude, whole crude, asphalt, coal tar, coal derived oil, shale oil, tar sand oil, and mixtures thereof. Pumpable slurries of solid carbonaceous fuel, e.g. particulate carbon, petroleum coke, and mixtures thereof in a vaporizable carrier, such as water, liquid hydrocarbon fuel and mixtures thereof are included within the definition of said heavy liquid hydrocarbon fuel.

The free-oxygen contaiing gas employed in the subject process is selected from the group consisting of air, oxygen-enriched air, i.e., greater than 21 mole % $O_2$ and substantially pure oxygen i.e. greater than 95 mole % $O_2$. The temperature moderator is selected from the group consisting of steam, water, $CO_2$-rich gas, nitrogen, and recycled synthesis gas.

EXAMPLE

The following example illustrates a preferred embodiment of this invention pertaining to the continuous operation of a partial oxidation process employing heavy hydrocarbon fuel feedstocks containing high metal concentrations and total soot recycle without plugging and fouling the tubes of a downstream convection-type gas cooler.

While preferred modes of operation are illustrated, the Example should not be construed as limiting the scope of the invention. The process is continuous and the flow rates are specified on an hourly basis for all streams of materials.

160,408 lbs. of a vacuum resid having a gravity of 2.0 degrees API and an Ultimate Analysis in weight percent as follows: C 83.45, H 10.10, N 0.35, S 5.5, and O 0.6 and containing the following metals in parts per million (ppm) V 594, Ni 98, Fe 64 in admixture with 5530 lbs. of recycled unreacted carbon in a liquid dispersion comprising 5.0 wt.% of soot with metals in a liquid carrier comprising said vacuum resid are mixed with 65,981 lbs. of steam from gas cooler 101 at a temperature of 574° F. and a pressure of 1165 psig. The mixture is passed through a passage in burner 17, at a temperature of 560° F. and a pressure of 1120 psig. The burner is located in the upper end of conventional vertical refractory lined free-flow noncatalytic unpacked synthesis gas generator 1.

Simultaneously, a stream of 174,453 lbs. of substantially pure oxygen i.e., 99.5 mole % $O_2$ at a temperature of 300° F. and a pressure of 1165 psig. is passed through another passage of the burner. The feed streams impinge, mix and the partial oxidation and other related reactions then take place in the reaction zone of gas generator 1. A stream of 8.80 million standard cubic feet (SCF measured at 60° F., 14.7 psig.) of hot raw synthesis gas leaves the reaction zone of the gas generator at a temperature of 2,596° F. and a pressure of 1,050 psig. The composition of the raw, synthesis gas in chamber 24 is shown in Column 1 of Table I. About 2,822 lbs. of unreacted particulate carbon and 1,413 lbs. of ash are entrained in the raw synthesis gas. The term 'ash' includes all of the reaction products of the metal compounds in the fuel feed to the gas generator.

With a flow control means for line 23 closed, such as 22 or alternatively 39, all of the hot raw gas stream leaving reaction zone 16 is introduced into quench water in quench tank 27, carrying with it substantially all of the entrained particulate matter, i.e., particulate carbon and ash being produced. The stream of raw synthesis gas is cooled and cleaned by the quench water and by supplemental scrubbing with water in venturi scrubber 48 and scrubbing and separating column 49 to produce the clean product stream of synthesis gas with a high $H_2O$/dry gas mole ratio of 1.57. This product stream of synthesis gas in line 51 comprises 30.45 million SCF and has the composition shown in Column 2 of Table I.

Simultaneously, 164,304 lbs. of a feedstream of vacuum resid from line 4 at a temperature of 574° F. and a pressure of 1,165 psig. in admixture with 63,838 lbs. of steam from gas cooler 101 is passed through one passage of burner 100 located in the upper end of conventional vertical refractory lined free-flow noncatalytic unpacked synthesis gas generator 2. A feedstream comprising 167,612 lbs. of substantially pure oxygen i.e., 99.5 mole % $O_2$ from line 18 at a temperature of 300° F. and a pressure of 1,165 psig. is passed through another passage of burner 100. The feedstreams impinge, mix, and the partial oxidation and other related reactions then take place in the reaction zone of gas generator 1. A stream of 8.59 million standard cubic feet (SCF) (measured at 60° F., 14.7 psig.) of raw synthesis gas leaves the reaction zone of gas generator 2 at a temperature of 2,504° F. and a pressure of 1,050 psig. The composition of the raw synthesis gas in chamber 89 is shown in Column 3 of Table I. About 2,706 lbs. of unreacted particulate carbon and 165 lbs. of ash are entrained in the stream of raw synthesis gas.

With flow control means for line 86 open, such as 85 or alternatively 108, all of the raw effluent gas stream leaving reaction zone 88 is immediately split into two hot raw gas streams in gas-diversion chamber 98. The first split hot raw gas stream comprising 4.29 million SCF of raw synthesis gas is passed through insulated passages 86 and 87, and cooled in gas cooler 101. The second split stream comprising the remainder of the hot raw effluent gas stream is simultaneously passed through dip-leg 102 and quench cooled in quench tank 73. The actual split between the two trains may be controlled by back pressure valves in each line.

The partially cooled first split gas stream leaving gas cooler 101 is scrubbed with water to produce 4.30 million SCF of clean synthesis gas with a low $H_2O$/dry gas mole ratio of 0.093. This product stream of synthesis gas in line 41 has the composition shown in Column 4 of Table I.

The water dispersion of particulate matter is removed from quench tanks 27 and 73 and from gas scrubbing and separating towers 33, 49 and 104 and processed in conventional soot recovery facility 6. About 697,503 lbs. of clarified water (line 72), 719 lbs. of ash (line 71), and 140,910 lbs. of a soot-vacuum resid dispersion (line 5) are obtained. The water is recycled to the quench tanks and scrubbers, and ash is removed and sent to a metals recovery plant for separating by-product vanadium and nickel, and the soot-vacuum resid dispersion is mixed with the heavy hydrocarbon fuel and recycled to gas generator 1 as a portion of the fuel, as previously described.

TABLE I

| Column No. | 1 | 2 | 3 | 4 |
|---|---|---|---|---|
| Drawing Reference No. | 24 | 51 | 89 | 41 |
| GAS COMPOSITION COMPOSITION MOLE % | | | | |
| CO | 44.87 | 19.29 | 44.25 | 44.34 |
| $H_2$ | 39.51 | 16.99 | 40.23 | 40.31 |
| $CO_2$ | 4.33 | 1.86 | 4.21 | 4.22 |
| $H_2O$ | 9.51 | 61.10 | 9.53 | 9.71 |
| $CH_4$ | 0.36 | 0.15 | 0.36 | 0.36 |
| Ar | 0.12 | 0.05 | 0.12 | 0.12 |
| $N_2$ | 0.09 | 0.04 | 0.09 | 0.09 |
| $H_2S$ | 1.15 | 0.50 | 1.15 | 1.15 |
| COS | 0.06 | 0.03 | 0.06 | 0.06 |

TABLE I-continued

| Column No. | 1 | 2 | 3 | 4 |
|---|---|---|---|---|
| Drawing Reference No. | 24 | 51 | 89 | 41 |
| GAS COMPOSITION COMPOSITION MOLE % | | | | |
| Metals and Metal Compounds (PPM) | 3470 | — | 420 | — |

By the subject invention, even though there is total carbon recycle in the process the metals content of the raw, split gas stream continuously entering a convection-type gas cooler may be limited to a value which will not exceed that corresponding to the metals content of the fresh hydrocarbon fuel feedstock. Build-up of metal deposits and fouling of boiler tubes may be thereby prevented and the life of the gas cooler extended.

Advantageously, the subject system provides for flexible operation and equipment back-up. In the event one gas-cooler or gas scrubber has to be shut down, for example for maintenance, a large proportion of the plant-design total synthesis gas output can be continuously produced by the other train. Further, two product streams of synthesis gas with high and low $H_2O$/dry gas mole ratios respectively may be simultaneously produced from low cost fuels containing a high metals content and total recycle of all soot produced in the system and with no substantial plugging or fouling of a convection-type gas cooler in the system.

The process of the invention has been described generally and by examples with reference to heavy hydrocarbon fuel and synthesis gas having particular compositions for purposes of clarity and illustration only. It will be apparent to those skilled in the art from the foregoing that various modifications of the process disclosed herein can be made without departure from the spirit of the invention.

We claim:
1. A partial oxidation process comprising:
  (1) reacting a reactant fuel feedstream comprising a heavy hydrocarbon fuel feedstock containing high metal concentrations in admixture with a liquid dispersion comprising soot in a liquid carrier with a free-oxygen containing gas in the presence of a temperature moderator at an autogenous temperature in the range of about 1700° to 3500° F. and a pressure in the range of about 5 to 300 atmospheres in the reaction zone of a first free-flow noncatalytic partial oxidation gas generator to produce a hot, raw stream of synthesis gas comprising $H_2$, CO, $CO_2$, particulate carbon, ash, and at least one material from the group $H_2O$, $CH_4$, $H_2S$, COS, $H_2$ and Ar;
  (2) quench cooling and scrubbing with water at least a portion of the hot, raw synthesis gas stream from (1), and separating a partially cleaned synthesis gas stream from a stream of liquid dispersion comprising particulate carbon, water, and ash;
  (3) simultaneously with (1) reacting a heavy hydrocarbon fuel feedstock containing high metal concentrations with a free-oxygen containing gas in the presence of a temperature moderator at an autogenous temperature in the range of about 1700° F. to 3500° F. and a pressure in the range of about 5 to 300 atmospheres in the reaction zone of a second free-flow noncatalytic partial oxidation gas generator to produce a hot, raw stream of synthesis gas comprising $H_2$, CO, $CO_2$, particulate carbon, ash, and at least one material from the group $H_2O$, $CH_4$, $H_2S$, COS, $H_2$ and Ar;

(4) splitting the hot, raw synthesis gas stream from (3) into first and second hot-split synthesis gas streams;

(5) cooling in a convection-type gas cooler all of the first hot, split gas stream from (4), scrubbing the partially cooled gas stream with water, and separating a clean product stream of synthesis gas with a low $H_2O$/dry gas mole ratio from a stream of liquid dispersion of particulate carbon, water, and ash;

(6) quench cooling and scrubbing with water all of the second hot, split gas stream from (4), and separating a partially cleaned synthesis gas stream from a stream of liquid dispersion comprising particulate carbon, water, and ash;

(7) mixing together the partially cleaned synthesis gas streams from (2) and (6), scrubbing the combined streams with water, and separating a clean product stream of synthesis gas with a high $H_2O$/dry gas mole ratio from a stream of liquid dispersion comprising particulate carbon, water, and ash;

(8) combining the streams of liquid dispersion comprising particulate carbon, water, and ash from (2), (5), (6), and (7); and separating in a soot-recovery zone separate streams of clarified water, ash, and a liquid dispersion comprising soot in a liquid carrier; and (9) mixing all of the liquid dispersion comprising soot in a liquid carrier from (8) with fresh heavy hydrocarbon fuel feedstock containing high metal concentrations, and introducing said mixture into the first partial oxidation gas generator in (1) as said reactant fuel feedstream.

2. The process of claim 1 wherein synthesis gas generators 1 and 2 are substantially of the same size, and about 45 to 55 volume percent of the plant-design total synthesis gas output is produced by gas generator 1 and the remainder of the plant-design total synthesis gas output is produced by gas generator 2.

3. The process of claim 2 wherein said first split, hot raw synthesis gas stream in (4) comprises about 10 to 40 vol.% of the plant-design total synthesis gas output and said second split, hot, raw synthesis gas stream comprises the remainder of the plant-design total synthesis gas output produced by gas generator 2.

4. The process of claim 1 wherein the $H_2O$/dry gas mole ratio of the clean product stream of synthesis gas from (5) is in the range of about 0.05 to 0.5.

5. The process of claim 1 wherein the $H_2O$/dry gas mole ratio of the clean product stream of synthesis gas from (7) is in the range of about 1.2 to 1.8.

6. The process of claim 1 provided with the steps of passing boiler feed water in indirect heat exchange with the first hot, split gas stream passing through the convection-type gas cooler in (5) to produce steam, and introducing said steam into gas generator 1 and/or 2 as said temperature moderator.

7. The process of claim 1 in which said heavy hydrocarbon fuel feedstock containing high metal concentrations is selected from the group consisting of crude residua from petroleum distillation and cracking process operations, petroleum distillate, reduced crude, whole crude, asphalt, coal tar, coal derived oil, shale oil, tar sand oil, and mixtures thereof.

8. The process of claim 1 in which said heavy hydrocarbon fuel feedstock comprises a pumpable slurry of particulate carbon, petroleum coke, and mixtures thereof, in a vaporizable liquid carrier, such as water, liquid hydrocarbon fuel, and mixtures thereof.

9. The process of claim 1 in which said temperature moderator is selected from the group consisting of steam, water, $CO_2$-rich gas, nitrogen, and recycled synthesis gas.

10. The process of claim 1 in which said free-oxygen containing gas is selected from the group consisting of air, oxygen-enriched air, i.e. greater than 21 mole % $O_2$, and substantially pure oxygen, i.e. greater than about 95 mole % oxygen.

* * * * *